United States Patent [19]

Berth et al.

[11] 4,409,177

[45] Oct. 11, 1983

[54] METHOD OF FORMING A WRAPAROUND CLOSURE ARTICLE

[75] Inventors: Jorgen Berth; Erling Hansen, both of Los Altos; Malcolm D. Heaven, Cupertino, all of Calif.; Tommy Petersen, Ishoej, Denmark

[73] Assignee: Raychem A/S, Glostrup, Denmark

[21] Appl. No.: 307,451

[22] Filed: Oct. 1, 1981

[51] Int. Cl.³ .............................................. B23B 1/00
[52] U.S. Cl. .................................. 264/531; 264/523; 264/536
[58] Field of Search ........................ 264/523, 531, 536; 425/525

[56] References Cited

FOREIGN PATENT DOCUMENTS 1103318 2/1968 United Kingdom .
1155470 6/1969 United Kingdom .
1165625 10/1969 United Kingdom .
1351206 4/1974 United Kingdom .
1493639 11/1977 United Kingdom .
1524054 9/1978 United Kingdom .
2001276 1/1979 United Kingdom .

*Primary Examiner*—Maurice J. Welsh
*Attorney, Agent, or Firm*—Douglas A. Chaikin; Herbert G. Burkard

[57] ABSTRACT

A wraparound closure article comprising a slit tubular body having upstanding rails extending along the slit is formed by a combination of blow-and compression-moulding. The rails are formed by compressing a longitudinal edge portion of a parison between two parts of a closed split-mould to form a flange, and the tubular body is formed integrally with the rails by blowing the remainder of the parison into contact with the closed mould. The flange is then cut to provide the slit of the wraparound closure article and to divide the flange into two discrete rails. The slit extends along the pinch-line that forms as a result of compressing the edge portion of the parison in the closed mould.

12 Claims, 7 Drawing Figures

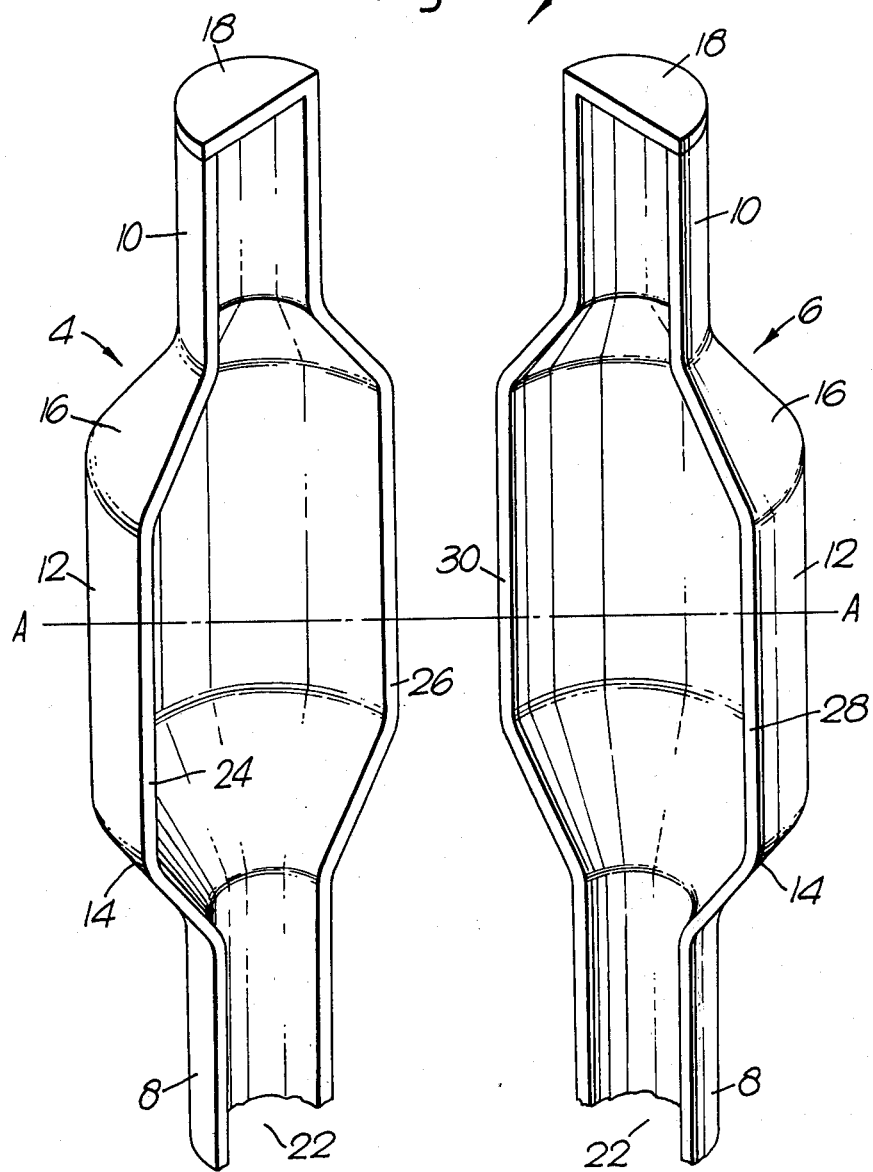

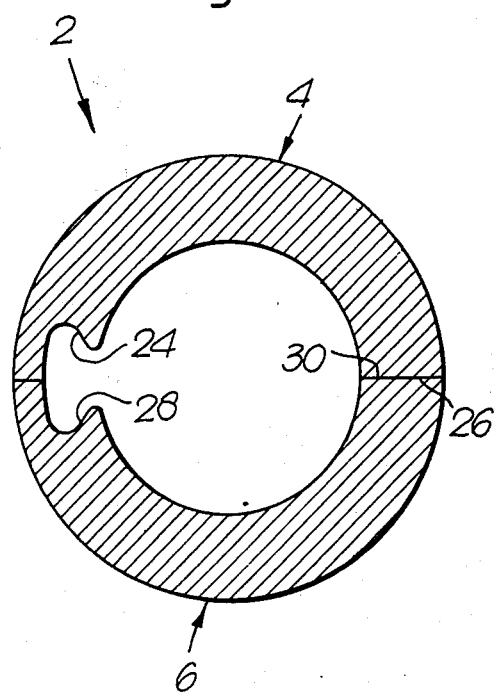
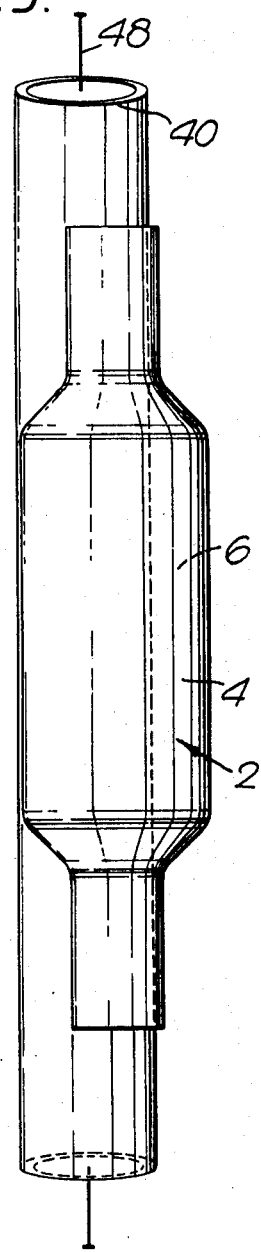

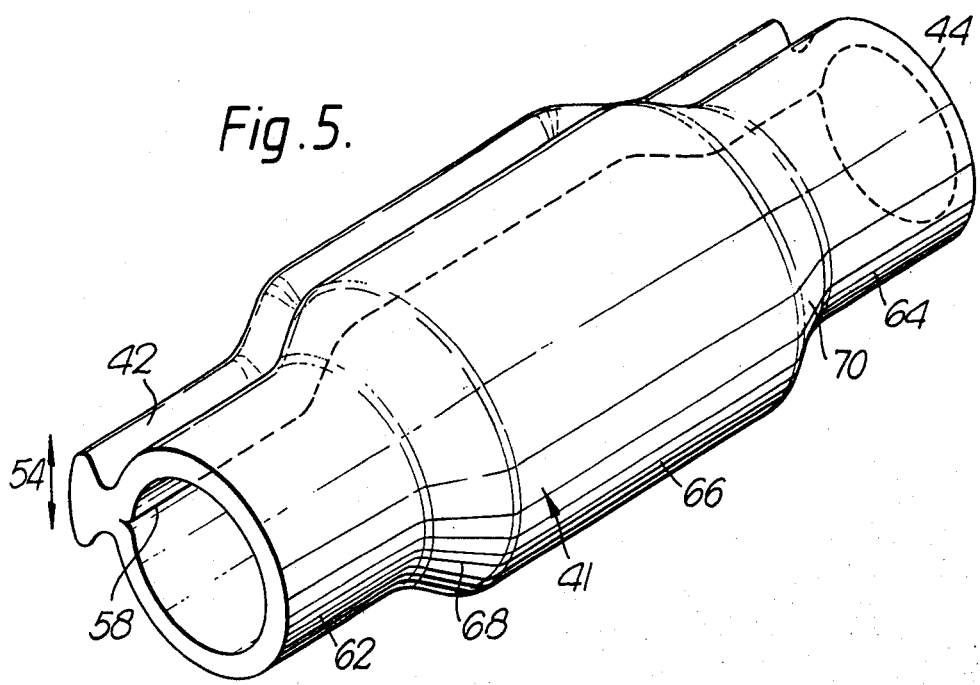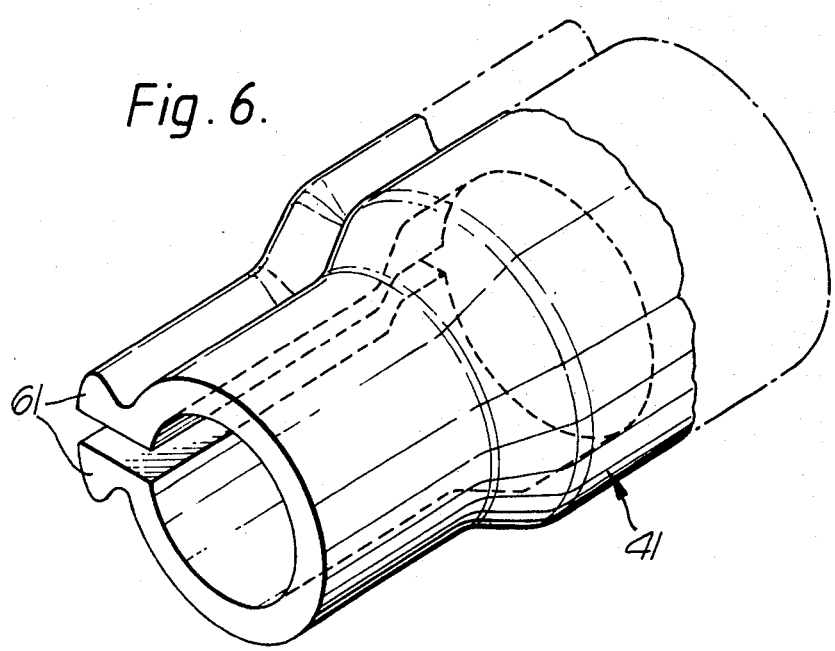

METHOD OF FORMING A WRAPAROUND CLOSURE ARTICLE

DESCRIPTION

This invention relates to a method of forming a wraparound closure article and to articles formed thereby.

Wraparound closure articles, for example wraparound sleeves are commonly used to provide environmental protection for substrates, particularly elongate substrates such as pipes or cables. The closure article may be used for example, to repair a damaged cable, or to seal a cable splice or pipe joint.

A typical wraparound closure is described in U.K. Pat. No. 1,155,470 and comprises a sheet, or slit tube, of cross-linked, heat-shrinkable, polymeric material having two upstanding rails, or flanges, which extend along opposed longitudinal edges of the slit tube or cylindrically wrapped sheet. In use the closure is wrapped around the substrate to be protected, and the rails secured together in abutment by a stainless steel channel. Heat is then applied to shrink the closure so as to seal it tightly about the substrate.

The known wraparound closure described above is generally fabricated by extruding a sheet or slit tube of generally uniform cross section, and expanding it transversely.

It is an object of the present invention to provide an improved method of forming a wraparound closure article.

The present invention provides a method of forming a wraparound closure article comprising a longitudinally-slit, generally tubular body portion having upstanding closure means adjacent the longitudinal slit, which method comprises:

(a) positioning a hollow elongate parison of polymeric material within an open split-mould such that on closing the mould at least one longitudinal edge portion of the parison is held between two parts of the mould to form the upstanding closure means;

(b) closing the mould;

(c) expanding the hollow parison into contact with the mould by differential pressure to form the body portion; and (d) slitting the article along the or each longitudinal edge portion.

Said at least one longitudinal edge portion of the parison is held between two parts of the mould to the extent that when the parison is expanded the edge portion is retained between the two mould parts, and advantageously is held such that the edge portion is compression moulded between the two mould parts. In this way it is possible starting, for example, with a parison of uniform wall thickness, to compression mould a closure means having a thickness greater than twice the thickness of the parison wall.

The upstanding closure means may be formed such as to provide, after slitting, two rails which may be secured together to close the slit article by a stainless steel channel, as described in U.K. Pat. No. 1,155,470.

The step of slitting the article is preferably effected along the pinch-line that is formed at the or each longitudinal edge portion on closing the mould. The term pinch-line is well understood in the art of moulding and refers to the line which results on the inner surface of a moulded part, generally in the form of an indent in the surface, when mating surfaces of two parts of a split-mould are brought together so that they hold, or pinch, part of the parison between them.

When a pinch-line is formed in a moulding process it is a region of weakness and a potential line of failure. According to the preferred feature of the present invention, described above, the slit of the wraparound closure is formed by slitting along the pinch-line and thus this region of weakness is avoided. Furthermore, if more than one longitudinal edge portion is held by the mould and thus forms a pinch-line, each is slit, preferably along the pinch-line thus avoiding any weak pinch-line regions in the finished article.

The formed wraparound closure article may have only one longitudinal slit. To this end, the mould and parison are arranged such that only one longitudinal edge portion of the parison is held by the mould on closure. This may conveniently be achieved, for example, by offsetting the parison relative to the mould so that as the mould is closed the parison is held and pinched by one side of the mould but is spaced from the other side.

The differential pressure is preferably provided by introducing gas into the parison to effect the expansion, that is to say the body portion of the closure article is formed by blow moulding. The gas is advantageously introduced into the parison along its axis. Alternatively, the parison may be expanded by vacuum drawing, that is by decreasing the pressure in the mould outside the parison.

In one embodiment the hollow parison is formed by extruding material between a central core, known as a dip, and an outer die. By varying the diameter of the dip during the extruding a tube of varying wall thickness may be produced. This is particularly advantageous where the parison is to be expanded to form articles which vary in cross-sectional area along their length, since the extruded tube may be arranged so that those parts of the tube that are expanded the most are the thickest. The arrangement may be such that the extruded and expanded article has a uniform wall thickness.

The polymeric material of the parison is preferably cross-linkable and the method of forming the article advantageously comprises the additional step of cross-linking the material. The method also advantageously comprises the step of making at least part of the article recoverable, preferably heat recoverable.

A heat recoverable article is an article the dimensional configuration of which may be made substantially to change when subjected to heat treatment.

Usually these articles recover, on heating, towards an original shape from which they have previously been deformed but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example, U.S. Pat. No. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat-unstable form in a separate stage.

In the production of heat recoverable articles, the polymeric material may be cross-linked at any stage in the production of the article that will enhance the desired dimensionally recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article whilst in the deformed state so that the deformed state of the article is retained. In use, since the deformed state of the article is heat-unstable, application of heat will cause the article to assume its original heat-stable shape.

In other articles, as described, for example, in British Pat. No. 1,440,524, an elastomeric member such as an outer tubular member is held in a stretched state by a second member, such as an inner tubular member, which, upon heating weakens and thus allows the elastomeric member to recover.

Known recoverable wraparound closure articles produced by extrusion and transverse expansion have a uniform cross-section, and when recovered about a substrate of varying cross-section accordingly recover to a different extent along their length. On recovery, the wall thickness of the closure article increases, and therefore when such a closure article is recovered about a non-uniform substrate such as a telecommunications cable splice the wall thickness is at its maximum value in the relatively large diameter splice region, where maximum protection is required. This is particularly disadvantageous in applications where there exists an excess pressure internally of the closure article, such as in the case of an article enclosing a splice between pressurised telecommunications cable.

In contrast, the present method may advantageously be used to form a recoverable wraparound closure article of non-uniform cross-section, corresponding to the final shape required, and having uniform wall thickness after recovery.

The mould may be shaped to produce an article having substantially cylindrical opposed end portions, a substantially cylindrical intermediate portion of larger diameter and tapered connecting portions which connect respective ones on said end portions to said intermediate portion. This article, which varies in cross-sectional area along its length, may be formed having uniform wall thickness by appropriate positioning in the mould of an extruded parison of varying wall thickness.

A method of forming a wraparound closure article having upstanding closure means, in accordance with the present invention, will now be described, by way of example, with reference to the accompanying drawings, in which:

FIG. 1 is a vertical perspective view of the split-mould used in the method in an open configuration;

FIG. 2 is a cross-section along the line A—A of the mould of FIG. 1 when closed;

FIG. 3 is a side view of a parison positioned in the mould of FIG. 1 after closure;

FIG. 5 is a perspective view of the moulded parison of FIG. 3 after removal of waste material;

FIG. 6 is a perspective view of part of the moulded parison of FIG. 5 slit longitudinally to form the closure article.

Figure 4:
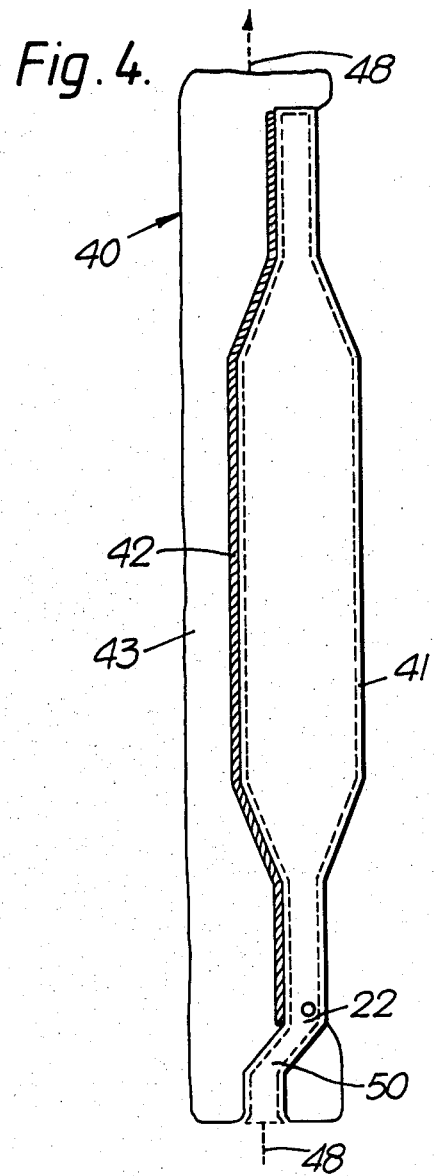
FIG. 4 is a side view of the moulded parison.

Referring to FIGS. 1 and 2 the split mould 2 comprises two half shells 4 and 6, which are mirror images of each other. The mould 2 comprises two opposed cylindrical end portions 8 and 10, an intermediate cylindrical portion 12, and two tapered connecting portions 14 and 16 connecting portion 12 to portions 8 and 10 respectively. End portion 10 is closed at 18, and end portion 8 is open to provide an air inlet 22.

The mould 2 is arranged such that on closure the edge surfaces 24 and 26 of half shell 4 mate with the edge surfaces 28 and 30 respectively of half shell 6.

Refering also to FIGS. 3 and 4, a tubular polymeric parison 40 of generally uniform cross-section is hot-extruded into the open mould 2 generally parallel but offset to one side relative to the mould axis. The parison 40 having centre line 48 is shown offset to the left relative to the half-shell 4 (FIG. 3). As a result of the offset of the parison 40, a longitudinal edge portion 42 thereof is held or sandwiched between the mating surfaces 24 and 28 on closure of the mould 2, and a further longitudinal portion 43 is exuded outside the mould and is waste material. Mating surfaces 26 and 30, on the other hand, abut each other when the mould 2 is closed since they are spaced from the parison 40 by the offset.

The parison 40 is still hot from the extrusion process when the mould 2 is closed and the end 18 of the mould 2 closes the parison 40 such that the interior of the parison 40 is a sealed cavity except in the region of the air inlet 22.

Compressed air is introduced into the parison 40 through the inlet 22 to blow the parison 40 into contact with the inner surface of the mould 2 to form a body portion 41 of the required article. The air is introduced axially along the centre line 48 of the parison 40, and since the parison 40 is offset relative to the mould an offset blowing arrangement 50 is used to deliver the air.

It will be appreciated that as the parison 40 is blown into contact with the mould 2, the walls of the parison become thinner. Since the mould is of non-uniform cross-section some parts of the parison wall are expanded further than other parts and consequently decrease in wall thickness to a greater extent. To compensate for this variation the parison is extruded so as to have a varying wall thickness along its length such that the final blown product has a uniform wall thickness.

Referring also to FIGS. 5 and 6, the mating surfaces 24 and 28 of the mould 2 are indented such that they compression mould the parison portion 42 to form an elongate portion of T-shape cross-section, the stem of the T projecting generally radially of the body portion 41. The compressed portionn 42 provides the upstanding closure means of the wraparound article, and is integral with the body portion 41. The thickness 54 of the closure means 42 is greater than twice the wall thickness of the extruded parison 40. The body 41 is of uniform wall thickness and has a shape corresponding to that of the mould into which it was blown, having two generally cylindrical end portions 62 and 64, an intermediate portion 66 of larger diameter and tapered interconnecting portions 68 and 70.

Sealed end 44 formed at the end 18 of the mould is cut off and the body 41 slit along a line 58, that bisects the compressed closure portion 42 along the stem of the T so as to form two upstanding flanges or rails 61.

Finally, end portions 62 and 64 and the tapered portions 68 and 70 are made heat-recoverable by cross-linking and expanding those portions, as hereinbefore described. The end and tapered portions 62,64,68,70 are expanded to a cross-section of slightly smaller area than the intermediate portion 66. It will be appreciated that expanding the end and tapered portions 62,64,68 and 70 of the closure decreases their wall thickness but that this increases again on recovery. The arrangement is such that the final recovered article is of uniformed wall thickness.

The line 58 along which the closure 42 is slit is formed during the closing of the mould as a pinch-line along the inner surface of the body portion 41. The offset arrangement of the parison 40 in the mould 2 as described above, ensures that only one longitudinal edge portion is sandwiched in the mould 2 so that there is only one longitudinal pinch-line. This is desirable since a pinch-line is generally weak and is a potential line of failure.

Figure 7:
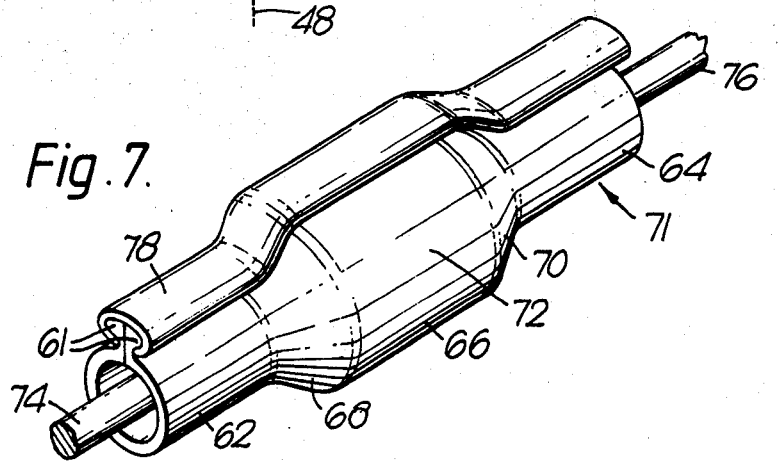
FIG. 7 shows the closure article of FIG. 6 applied to protect a cable splice.

FIG. 7 shows the slit, heat recoverable wraparound closure article applied to protect a cable splice 72. The article 71 is wrapped around the spliced cable, the large diameter non-recoverable portion 66 surrounding the bulky splice 72 and the narrower recoverable ends 62 and 64 surrounding the cables 74 and 76 on either side. The article 71 is closed by sliding a stainless steel channel 78 over the rails 61 to retain them in abutment. Heat is then applied to recover the expanded portions 62,64,68 and 70 on to respective cables 74 and 76, environmentally sealing the splice 72.

We claim:

1. A method of forming a wraparound closure article comprising a longitudinally-slit, generally tubular body potion having upstanding closure means adjacent the longitudinal slit, which method comprises:
   (a) positioning a hollow elongate parison of polymeric material within an open split-mould such that on closing the mould at least one longitudinal edge portion of the parison is held between two parts of the mould to form the upstanding closure means;
   (b) closing the mould;
   (c) expanding the hollow parison into contact with the mould by differential pressure to form the body portion; and
   (d) slitting the article along the or each longitudinal edge portion.

2. A method according to claim 1, wherein the slitting of the article is effected along the pinch line that is formed at the or each longitudinal edge portion on closing the mould.

3. A method according to claim 1, wherein the holding of the edge portion of the parison moulds said portion by compression to form the closure means.

4. A method according to claim 1, wherein said differential pressure is provided by introducing gas into the hollow parison within the closed mould, thereby to blow-mould the body portion of the article.

5. A method according to claim 4, wherein the gas is introduced into the parison substantially axially thereof.

6. A method according to claim 1, wherein said at least one longitudinal edge portion of the parison extends along substantially the entire length thereof.

7. A method according to claim 1, wherein said polymeric material is cross-linkable, and wherein the method comprises cross-linking the material.

8. A method according to claim 1, comprising the step of making the article recoverable, at least in part.

9. A method according to claim 1, wherein the parison is produced by extrusion.

10. A method according to claim 1, wherein the mould is shaped to produce an article having substantially cylindrical opposed end portions, a substantially cylindrical intermediate portion of larger diameter, and tapered connecting portions connecting respective ones of said end portions to said intermediate portion, and wherein said at least one longitudinal edge portion of the parison is held by each of said portions of the mould.

11. A method of forming a wraparound closure article comprising a longitudinally-slit, generally tubular body portion having upstanding closure means adjacent the longitudinal slit, which method comprises:
   (a) positioning a hollow elongate parison of polymeric material within an open slit-mould such that on closing the mould one longitudinal edge portion of the parison is compression moulded between two parts of the mould to form the upstanding closure means, said longitudinal edge portion of the parison extending along substantially the entire length of the parison;
   (b) closing the mould;
   (c) expanding the hollow parison into contact with the mould by introducing gas into the hollow parison within the closed mould substantially axially of the parison to blow-mould the body portion; and
   (d) slitting the article along the pinch line that is formed at the longitudinal edge portion on closing the mould.

12. An article formed by the method of claim 1.

* * * * *